United States Patent [19]

Saget

[11] 4,262,386
[45] Apr. 21, 1981

[54] APPARATUS FOR HOLDING AN ANIMAL'S HEAD SEVERED FROM ITS BODY

[75] Inventor: Pierre C. Saget, Vincennes, France

[73] Assignee: La Parmentiere P. Blache & Cie, La-Ferriere, France

[21] Appl. No.: 94,183

[22] Filed: Nov. 13, 1979

[30] Foreign Application Priority Data

Nov. 15, 1978 [FR] France ................................ 78 32248

[51] Int. Cl.³ ............................................. A22C 17/02
[52] U.S. Cl. ........................................... 17/44; 83/733; 83/460; 83/465
[58] Field of Search ..................... 17/44, 1 R; 83/460, 83/465, 733, 375

[56] References Cited

U.S. PATENT DOCUMENTS

| 3,952,621 | 4/1976 | Chambos | 83/733 |
| 4,213,228 | 7/1980 | Komatsu et al. | 83/733 X |

FOREIGN PATENT DOCUMENTS

| 2833366 | 11/1979 | Fed. Rep. of Germany | 17/44 |
| 718103 | 10/1966 | Italy | 17/44 |

Primary Examiner—Willie G. Abercrombie
Attorney, Agent, or Firm—Berman, Aisenberg & Platt

[57] ABSTRACT

Apparatus for holding the head of an animal severed from its body for use in cutting the edible portions from the bones. The head is clamped between first and second members rotatably about a common axis and displaceable towards each other. The snout is received in the appropriately configured first member and a prong of the second member penetrates into the foramen magnum in the occipital bone. The rotation of the first and second members may be braked or arrested by a friction brake. To move the lower jaw away from the upper jaw in order to remove the lower jaw a hook member engaged the lower jaw and pulls it open by means of a foot-operated piston-and-cylinder unit. Another piston-and-cylinder unit forcibly drives the first and second members toward each other to firmly clamp the head therebetween.

6 Claims, 4 Drawing Figures

APPARATUS FOR HOLDING AN ANIMAL'S HEAD SEVERED FROM ITS BODY

The present invention relates to an apparatus for holding animal heads of slaughtered animals once they are severed from their bodies for their subsequent processing.

The processing of animals heads once they have been severed from their bodies, comprising separating the edible portions from the bones, is currently performed manually. This operation requires great manual skill and considerable physical strength because some typical animal heads reach weights of 40 kg and the separation of the lower jaw requires onsiderable force, particularly for the head of a freshly slaughtered animal.

Customarily the butcher receives the head on his table and holds it still between one hand, the rest of that arm and his chest which is laborious, owing to the slippery nature of the meat, while he removes the meat with his other hand with a suitable cutting tool.

An apparatus which holds the head during part of the operation has already been proposed and comprises a bifurcated member which extends into the nostrils and a rest against which the occipital region bears which facilitates the butcher's work. The apparatus also comprises a lever for moving the lower jaw away form the upper jaw.

This apparatus appreciably relieves the physical work but it is only efficacious if the head is held in a horizontal position resting on the table, for the bifurcated member which penetrates into the nostrils are surrounded by fleshly or cartilaginous tissues which cannot withstand the weight of the head to the extent of holding it in a sufficiently fixed position and therefore the lever for moving the lower jaw away from the upper jaw cannot remove it completely.

The same remarks hold a propos of the device disclosed in U.S. Pat. No. 2,549,937, in which the head is placed on the table and held by two resiliently mounted side fingers.

There are of course devices for holding hams or similar parts of an animal which bear against the ends of the bone for processing it while it is rotated about its axis but such devices are not specially devised to accomodate the peculiar configuration of a head.

SUMMARY OF THE INVENTION

An object of the invention is to provide an apparatus for holding an animal head in any orientation whatsoever so as to facilitate the job of separating the edible portions from the bones thereof.

According to the invention there is provided an apparatus for holding the head of a slaughtered animal severed from the body thereof, the apparatus comprising a first member engageable with the front part of the head, a second member engageable with the back or occipital region of the head, means for forcibly driving the first and second members relative to each other, and means for moving the lower jaw away from the upper jaw.

In this apparatus the first member is generally part funnel-shaped and arranged to bear against the upper teeth and/or upper jaw and the upper part of the bone region of the snout when the head is brought into position relative to the first member. The second member comprises a prong member arranged to penetrate into the foramen magnum or large hole in the occipital bone. The first and second members are adapted to rotate about a common axis and move relative to each other along the common axis. Means are provided on at least one of the members for preventing rotation about the common axis when working on the head to remove the edible parts from the bone.

Preferably, the first and second members are mounted on a common support, the support being rotatably mounted about a vertical axis relaltive to a fixed frame and arrested or braked against rotation about the fixed frame during work. Advantageously, the common support comprises two telescopically mounted parts each carrying one of said members and means operating the first and second members for moving them toward each other along the common axis; and a least one of the means for arresting or braking the members against rotation about their common axis or the support about the vertical axis comprises an adjustable friction brake. According to an interesting embodiment the apparatus comprises a fixed bracket having a hook member for wrenching the lower jaw open by means of a piston -and-cylinder unit.

The invention will be described in greater detail with reference to a non limiting embodiment of the invention with the help of the accompanying drawings.

BRIEF DESCRIPTION OF THE DRAWINGS

FIGS. 2, 3 and 4 are respectively on an enlarge scale an elevational view and fragmentary front and top views of the first member of the same apparatus.

DETAILED DESCRIPTION OF THE PREFERRED EMBODIMENT

Figure 1:
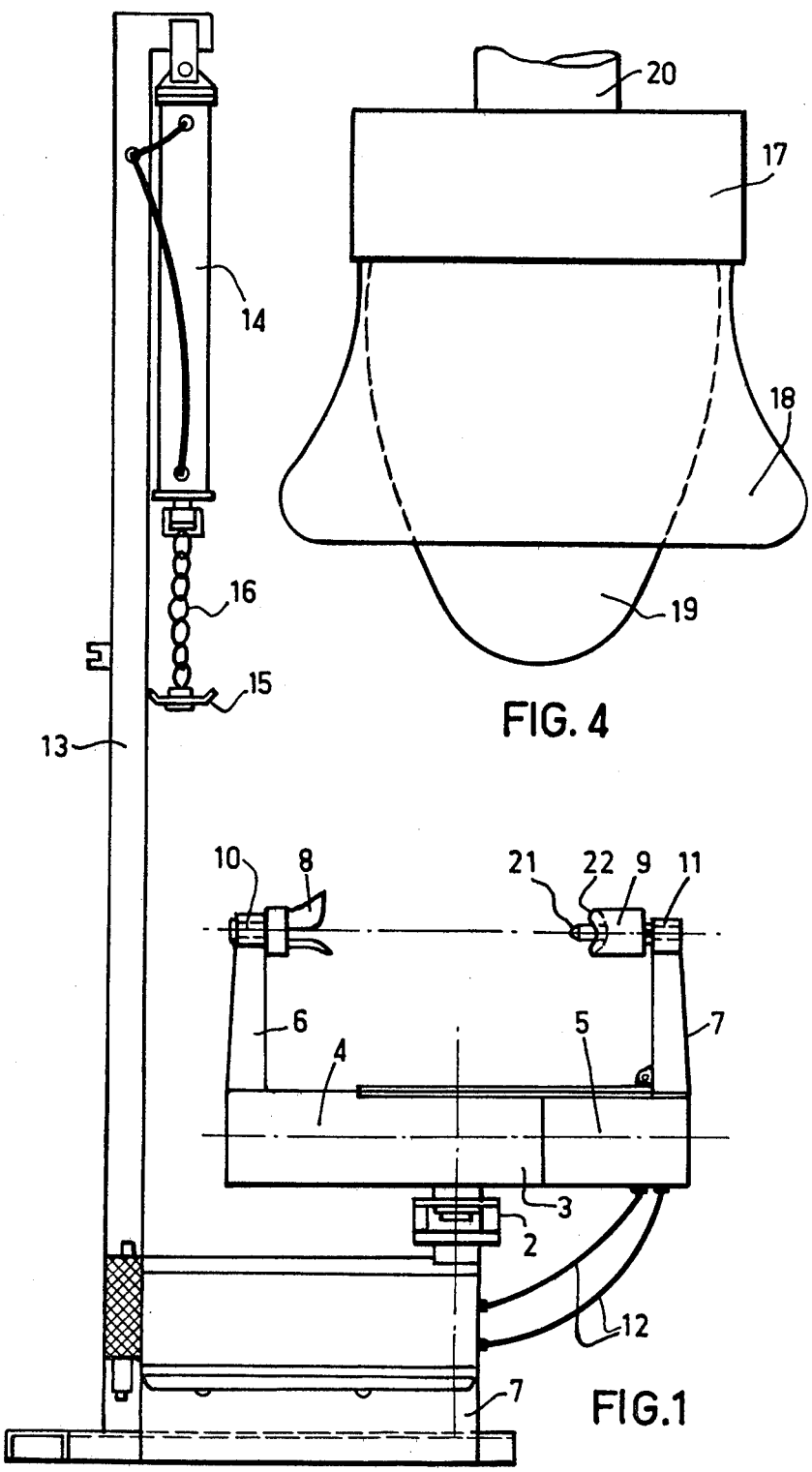
FIG. 1 is a general elevational view of the apparatus embodying the invention.
Figure 2:
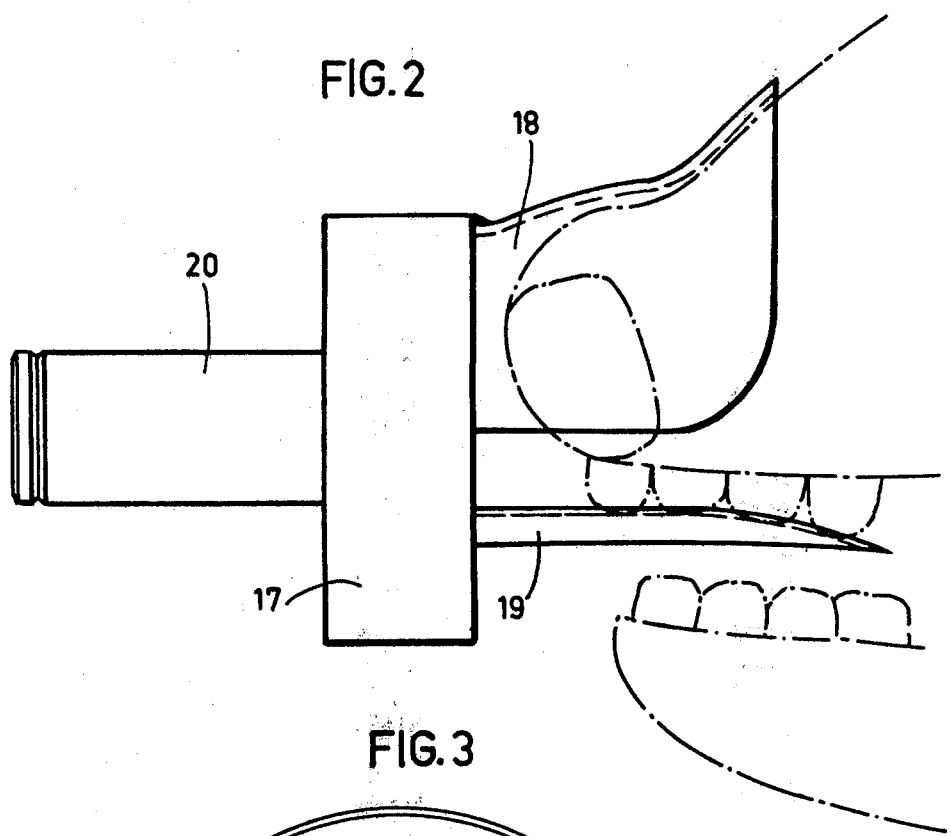
Figure 3:
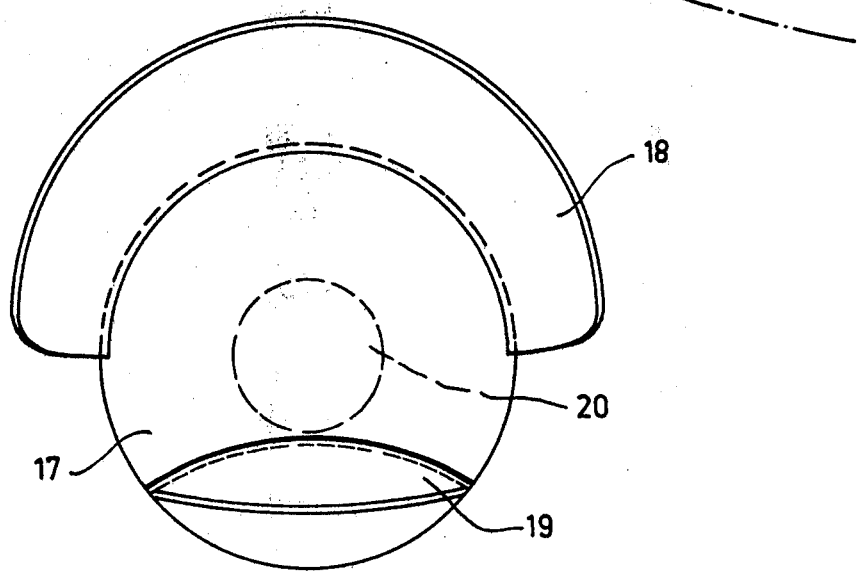

The apparatus comprises a base 1 which is adapted to be fixed to the ground and carries a telescopic support by means of a vertical pivot or pintle 2. The telescopic support comprises two members 4 and 5 which are slidably mounted for horizontal movement relative to each other by means of a double-action piston-and-cylinder unit 3a with a horizontal axis. Part 4 of the support comprises an upright arm 6 carrying a first member 8 adapted to receive the snout of the animal's head, and part 5 comprises an upright arm 7 carrying a second member 9 adapted to support the back or occipital region of the animal head. Arms 6 and 7 are the same height and carry at their upper ends members 8 and 9 by means of coaxial pivots 10 and 11. Hoses 12 connect the piston-and-cylinder unit 3a of the telescopic support with a source of compressed air, not shown. The base 1 also comprises a bracket 13 which supports at its upper end another piston-and-cylinder unit 14 on a pivot which is adapted to exert a traction force on hook member 15 through chain 16 to pull it upwards.

The first member 8 of the apparatus has a particular configuration adapted to its function. It comprises a circular collar 17 on which an upper support part 18 and a lower support part 19 are fixed. The upper support part 18 is in the form of a half of a funnel including two connected frustoconical zones, the tapered end of the upper support 18 being attached at the collar 17. The upper support part 17 is adapted to come into contact with the bony upper part of the snout of the animal head. The shape described here corresponds to bovine anatomy but it will be understood that other shapes will correspond to the other kinds of slaughtered animals. The lower support part 19 has a different shape, namely that of a slightly outwardly curved tongue and not part of a funnel. The lower support part 19 tapers toward its free end as seen in FIG. 4. The shape of the lower support part 19 approximates the roof of the animals mouth and permits the upper teeth and/or upper jaw to bear firmly thereon.

Extending from the opposite side of collar 17 to the upper and lower support part 18 and 19 is a shank 20 which defines the pivot 10 the axis of which substantially coincides with the axis of the frustoconical portions of the upper support part 18.

The second member 9 has a simpler configuration and comprises a prong 21 of suitable length and diameter to penetrate into the large hole or foramen magnum in the occipital bone and a shoulder 22 adapted to bear against the bony part surrounding the foramen magnum. The axis of the prong 21 substantially coincides with the axis of the associated pivot 11.

The animal head held between the first and secont members 8 and 9 may pivot about the common axis of pivots 10 and 11. The distribution of the weight of the head is such that it has a tendency to take a stable, balanced position in which its center of gravity lies below the common axis.

To enable work to be performed easily in other positions the pivot 10 is provided with means for arresting or braking rotation which is a brake comprising friction discs clamped together by an adjustable force determined by nuts acting on Belleville washers. The head may thus be immobilized at will at any angular orientation relative to the common axis defined by pivots 10 and 11. It is obvious that a similar brake may be provided for the other pivot 10.

The pintle 2 is provided with a similar brake.

The butcher places the front part of the head to be prepared between the upper and lower support parts 18 and 19 of the first member 8 and he inserts the prong 21 into the foramen magnum and clamps the head in position by means of the piston-and-cylinder unit 3a associated with the telescopic support 3. The brake associated with the pivot 11 is adjusted to apply a sufficient friction force so that the head does not move when working thereon while permitting changes of orientation about the common axis when desired.

To remove the lower jaw, the hook member 15 is engaged under the lower jaw with the head rotated through 180° from its normal position, and the piston-and-cylinder unit 14 is actuated progressively with the possibility of stopping it in a given position to cut muscles to make the removal of the lower jaw easier.

The piston-and cylinder units 31 and 14 may be controlled by foot.

Thus the physical forces exerted to maintain the head in position during the cutting, wrenching and removal of the lower jaw are eliminated and the butcher may work more comfortably and efficiently.

In particular, it is advantageous that the piston-and cylinder unit 14 which serves the removal of the lower jaw be provided with a dual control pedal 23 which permits the unit to be held stationary in any given position along its stroke thereby permitting it to operate in small incriments to avoid that any violent impact may occur near the end of the removal operation. Of course the unit and its control may be replaced by any equivalent device.

What we claim is:

1. Apparatus for holding the head of a slaughtered animal severed from the body thereof, said apparatus comprising a first member engageable with the front of the animal head, a second member engageable with the back or occipital region of the head, means mounting said first and second members for rotation about a common axis, means mounting said first and second members for relative displacement toward each other along said common axis, means for forcibly driving said first and second members relatively toward each other, means associated with one of said members for preventing rotation about said common axis when working on the head, means for moving the lower jaw of the head away from the upper jaw; the improvement comprising said first member being part funnel-shaped and arranged to bear against the upper teeth andor upper jaw of the head and the upper part of the bony region of the snout of the head, when the head is positioned relative to said first member, and said second member having a prong member adapted to penetrate into the foramen magnum of the occipital bone of the head.

2. Apparatus according to claim 1, said first and second members being mounted on a common support, further comprising means for rotatably mounting said support about a vertical axis relative to a fixed frame and means for arresting or braking rotation of said support relative to said fixed frame when working on the head.

3. Apparatus according to claim 2, wherein said common support comprises two telescopically mounted parts, each of said parts carrying one of said members, said means for forcibly driving said members relatively towards each other cooperating with one of said parts.

4. Apparatus according to claim 2, wherein at least one of said means for arresting or braking comprises an adjustable friction brake.

5. Apparatus according to claim 1, further comprising a fixed bracket, said means for moving the lower jaw away from the upper jaw including a hook member adapted to engage the lower jaw and attached to a piston-and-cylinder unit for applying force to said hook member for moving the lower jaw away from the upper jaw.

6. Apparatus according to claim 5, further comprising foot-operated control means for said piston-and-cylinder unit for maintaining the piston of said unit in a temporarily stationary position relative to its cylinder anywhere along its stroke.

* * * * *